US007509187B2

(12) United States Patent
Hayes et al.

(10) Patent No.: US 7,509,187 B2
(45) Date of Patent: Mar. 24, 2009

(54) WHEELCHAIR LIFT WITH A ROTARY SENSOR USED TO DETERMINE LIFT POSITION

(75) Inventors: John W. Hayes, Winamac, IN (US); Keith D. Heigl, Winamac, IN (US)

(73) Assignee: The Braun Corporation, Winamac, IN (US)

( * ) Notice: Subject to any disclaimer, the term of this patent is extended or adjusted under 35 U.S.C. 154(b) by 47 days.

(21) Appl. No.: 11/068,516

(22) Filed: Feb. 28, 2005

(65) Prior Publication Data

US 2006/0195220 A1 Aug. 31, 2006

(51) Int. Cl.
*G06F 7/00* (2006.01)
*B66B 9/08* (2006.01)
*B66B 9/02* (2006.01)
*B60P 1/00* (2006.01)
*B65F 1/00* (2006.01)
*B65F 3/00* (2006.01)

(52) U.S. Cl. ....................... 700/213; 187/200; 187/250; 414/540; 414/545

(58) Field of Classification Search ................. 700/213; 187/200, 201, 247, 250; 414/228, 540, 541, 414/545, 546, 921
See application file for complete search history.

(56) References Cited

U.S. PATENT DOCUMENTS 3,737,009 A * 6/1973 Stoddard .................... 187/282
3,846,860 A * 11/1974 Kummerman .............. 14/71.1
3,984,014 A * 10/1976 Pohl ........................... 414/546
5,025,892 A * 6/1991 Stelzl ......................... 187/210
5,632,593 A * 5/1997 Aoki .......................... 414/541
5,720,364 A * 2/1998 Glover ....................... 187/201
5,864,101 A * 1/1999 Nishizawa et al. .......... 187/285
5,890,564 A * 4/1999 Olsen et al. ................. 187/250
6,043,741 A * 3/2000 Whitmarsh ................. 340/540
6,053,693 A * 4/2000 Ringdahl et al. ............ 414/545
6,056,501 A * 5/2000 Ishikawa et al. ............ 414/636
6,086,314 A * 7/2000 Savaria ....................... 414/546
6,179,545 B1 1/2001 Petersen et al.
6,236,905 B1 5/2001 Whitmarsh
6,286,629 B1 * 9/2001 Saunders .................... 187/394
6,409,458 B1 6/2002 Cohn et al.
6,547,509 B1 * 4/2003 Edmo ......................... 414/639
6,611,746 B1 * 8/2003 Nagai .......................... 701/50
7,051,841 B1 * 5/2006 Kasbergen et al. .......... 187/201
7,103,935 B2 * 9/2006 Hill ............................ 14/71.3
7,191,038 B2 * 3/2007 Green et al. ................ 700/275
2005/0238471 A1 * 10/2005 Ablabutyan et al. ......... 414/546
2005/0279580 A1 * 12/2005 Szentistvany ............... 187/201
2007/0086879 A1 * 4/2007 Goodrich et al. ............ 414/537

* cited by examiner

*Primary Examiner*—Gene Crawford
*Assistant Examiner*—Ramya G Prakasam
(74) *Attorney, Agent, or Firm*—Michael Best & Friedrich LLP

(57) ABSTRACT

A wheelchair lift having a pivot and a platform. A rotary position sensor is mounted at the pivot and configured to generate an output signal. A controller is configured to receive the output signal of the rotary position sensor and determine the position of the platform based on the output of the rotary position sensor.

20 Claims, 15 Drawing Sheets

| Transition | Equation |
|---|---|
| A | ((C_POS < (P_STOWED + HYST)) & !P_ERROR & (!(FOLD ^ UNFOLD ^ SF_UP ^ SF_DOWN) \| UP \| DOWN) & SWITCH_ON) |
| B | ((UNFOLD ^ SF_DOWN) & !(FOLD \| UP \| DOWN \| SF_UP) & (C_POS < (P_STOWED + HYST)) & !P_ERROR) |
| C | ((UNFOLD ^ SF_DOWN) & !(FOLD \| UP \| DOWN \| SF_UP) & (C_POS < (P_FLOOR- FLOOR_DOWN_OFFSET)) & !P_ERROR) |
| D | ((C_POS > (P_FLOOR + HYST)) & !P_ERROR) |
| E | ((C_POS <= P_FLOOR) & !P_ERROR) |
| F | ((UNFOLD ^ SF_DOWN) & !(FOLD \| UP \| DOWN \| SF_UP) & (C_POS >= (P_FLOOR - FLOOR_DOWN_OFFSET))) |
| G | ((UNFOLD \| FOLD \| UP \| DOWN \| SF_UP \| SF_DOWN) & SWITCH_ON) |
| H | (!(UNFOLD \| FOLD \| UP \| DOWN \| SF_UP \| SF_DOWN)) |
| I | ((C_POS <= (P_FLOOR + HYST)) & (C_POS >= (P_FLOOR - HYST - 3)) & (!(FOLD ^ DOWN ^ SF_UP ^ SF_DOWN ^ (UP & (C_POS > P_FLOOR))) \| (UP & (C_POS <= P_FLOOR)) \| UNFOLD) & SWITCH_ON & O_BARRIER & O_LATCH) |
| J | ((DOWN ^ SF_DOWN) & !(UP \| FOLD \| UNFOLD \| SF_UP) & O_BARRIER & O_LATCH & IB_OCC) |
| K | ((DOWN ^ SF_DOWN) & !(UP \| FOLD \| UNFOLD \| SF_UP) & O_BARRIER & O_LATCH & IB_OCC & (C_POS < P_THRESHOLD) & !P_ERROR) |
| L | ((DOWN ^ SF_DOWN) & !(UP \| FOLD \| UNFOLD \| SF_UP) & O_BARRIER & O_LATCH & IB_OCC & (C_POS > (P_THRESHOLD - HYST)) & !P_ERROR) |
| M | ((DOWN ^ SF_DOWN) & !(UP \| FOLD \| UNFOLD \| SF_UP) & O_BARRIER & O_LATCH & !THRESH_A & !THRESH_B & BRIDGE & (C_POS < P_IB_LOCKED) & !P_ERROR) |
| N | ((DOWN ^ SF_DOWN) & !(UP \| FOLD \| UNFOLD \| SF_UP) & !THRESH_A & !THRESH_B & BRIDGE & (C_POS > (P_IB_LOCKED - HYST)) & !P_ERROR) |

Fig. 3A

| | |
|---|---|
| O | (!(FOLD ^ SF_UP) \| UNFOLD \| UP \| DOWN \| SF_DOWN) |
| P | ((!(FOLD ^ UNFOLD ^ SF_UP ^ SF_DOWN) \| UP \| DOWN) & (C_POS > P_STOWED) & (C_POS < (P_FLOOR- HYST)) & SWITCH_ON & !P_ERROR) |
| Q | ((DOWN ^ SF_DOWN) & !(UP \| FOLD \| UNFOLD \| SF_UP) & I_BARRIER & !THRESH_A & !THRESH_B & BRIDGE & (C_POS > (P_IB_LOCKED - HYST)) & !P_ERROR & (O_BARRIER \| (D_POS >= (C_POS - MAX_DOWN)))) |
| R | ((!(DOWN ^ SF_DOWN) \| FOLD \| UNFOLD \| UP \| SF_UP) & I_BARRIER & !THRESH_A & !THRESH_B) |
| S | ((DOWN ^ SF_DOWN) & !(UP \| FOLD \| UNFOLD \| SF_UP) & I_BARRIER & !THRESH_A & !THRESH_B & BRIDGE & (C_POS > (P_IB_LOCKED - HYST)) & !P_ERROR & (O_BARRIER \| (D_POS >= (C_POS - MAX_DOWN)))) |
| T | ((FOLD ^ SF_UP) & !(UNFOLD \| UP \| DOWN \| SF_DOWN) & (C_POS < P_S_RELIEF) & (C_POS >= P_STOWED)) |
| U | ((!(DOWN ^ UP ^ SF_UP ^ SF_DOWN) \| FOLD \| UNFOLD) & !P_ERROR & (!THRESH_A & !THRESH_B \| (C_POS < P_THRESHOLD)) & ((C_POS < P_IB_LOCKED) \| I_BARRIER) & ((O_BARRIER & O_LATCH) \| (C_POS > P_THRESHOLD)) & ((O_BARRIER \| !BRIDGE) \| OB_WARN_FLAG) & (C_POS > P_FLOOR) & SWITCH_ON) |
| V | (!(FOLD ^ SF_UP) \| UNFOLD \| UP \| DOWN \| SF_DOWN) |
| W | ((DOWN ^ SF_DOWN) & !(UP \| FOLD \| UNFOLD \| SF_UP) & O_BARRIER & O_LATCH & !THRESH_A & !THRESH_B & BRIDGE & (C_POS < P_IB_LOCKED) & (C_POS > P_THRESHOLD)) |
| X | (!(DOWN ^ SF_DOWN) \| UP \| FOLD \| UNFOLD \| SF_UP) |
| Y | ((DOWN ^ SF_DOWN) & !(UP \| FOLD \| UNFOLD \| SF_UP) & O_BARRIER & O_LATCH & !G_DETECT & IB_OCC & (C_POS <= P_THRESHOLD) & (C_POS > P_FLOOR)) |
| Z | (!(DOWN ^ SF_DOWN) \| UP \| FOLD \| UNFOLD \| SF_UP) |

Fig. 3B

<table>
<tr><td>AA</td><td>((FOLD ^ SF_UP) & !(UNFOLD | UP | DOWN | SF_DOWN) & (C_POS < P_FLOOR) & (C_POS >= P_S_RELIEF))</td></tr>
<tr><td>AB</td><td>((UP ^ SF_UP) & !(DOWN | FOLD | UNFOLD | SF_DOWN) & (C_POS > P_IB_LOCKED) & !P_ERROR & I_BARRIER & !THRESH_A & !THRESH_B & (C_POS > (P_GROUND_BACKUP - MAX_DEPART)) & G_DETECT & !DEPART)</td></tr>
<tr><td>AC</td><td>((!(UP ^ SF_UP) | DOWN | FOLD | UNFOLD | SF_DOWN) & (C_POS > P_IB_LOCKED) & !P_ERROR & I_BARRIER & !THRESH_A & !THRESH_B & (C_POS > (P_GROUND_BACKUP - MAX_DEPART)))</td></tr>
<tr><td>AD</td><td>((UP ^ SF_UP) & !(DOWN | FOLD | UNFOLD | SF_DOWN) & (C_POS > P_IB_LOCKED) & !P_ERROR & I_BARRIER & !THRESH_A & !THRESH_B & !O_BARRIER & OB_OCC & (C_POS > (P_GROUND_BACKUP - MAX_DEPART)) & G_DETECT)</td></tr>
<tr><td>AE</td><td>((UP ^ SF_UP) & !(DOWN | FOLD | UNFOLD | SF_DOWN) & (C_POS > P_IB_LOCKED) & !P_ERROR & I_BARRIER & !THRESH_A & !THRESH_B & (!G_DETECT | O_BARRIER))</td></tr>
<tr><td>AF</td><td>((UP ^ SF_UP) & !(DOWN | FOLD | UNFOLD | SF_DOWN) & (C_POS > P_IB_LOCKED) & !P_ERROR & I_BARRIER & !THRESH_A & !THRESH_B & ((C_POS >= (P_GROUND - THREE_INCHES)) | (O_BARRIER & O_LATCH)))</td></tr>
<tr><td>AG</td><td>((UP ^ SF_UP) & !(DOWN | FOLD | UNFOLD | SF_DOWN) & (C_POS > P_IB_LOCKED) & !P_ERROR & I_BARRIER & !THRESH_A & !THRESH_B & (!O_BARRIER | (O_BARRIER & !O_LATCH)) & (C_POS > (P_GROUND - THREE_INCHES)))</td></tr>
<tr><td>AH</td><td>((UP ^ SF_UP) & !(DOWN | FOLD | UNFOLD | SF_DOWN) & (C_POS > P_IB_LOCKED) & !P_ERROR & I_BARRIER & !THRESH_A & !THRESH_B & O_BARRIER & O_LATCH)</td></tr>
<tr><td>AI</td><td>((UP ^ SF_UP) & !(DOWN | FOLD | UNFOLD | SF_DOWN) & (C_POS > P_IB_LOCKED) & !P_ERROR & I_BARRIER & !THRESH_A & !THRESH_B & O_BARRIER & O_LATCH)</td></tr>
</table>

Fig. 3C

<table>
<tr><td>AJ</td><td>((!(UP ^ SF_UP) | DOWN | FOLD | UNFOLD | SF_DOWN) & (C_POS > P_IB_LOCKED) & !P_ERROR & I_BARRIER & !THRESH_A & !THRESH_B & O_BARRIER & O_LATCH)</td></tr>
<tr><td>AK</td><td>((!(UP ^ SF_UP) | DOWN | FOLD | UNFOLD | SF_DOWN) & (C_POS > P_IB_LOCKED) & !P_ERROR & I_BARRIER & !THRESH_A & !THRESH_B)</td></tr>
<tr><td>AL</td><td>((UP ^ SF_UP) & !(DOWN | FOLD | UNFOLD | SF_DOWN) & (C_POS > P_IB_LOCKED) & !P_ERROR & I_BARRIER & !THRESH_A & !THRESH_B & (C_POS > (P_GROUND_BACKUP - MAX_DEPART)) & (!G_DETECT | DEPART))</td></tr>
<tr><td>AM</td><td>((UP ^ SF_UP) & !(DOWN | FOLD | UNFOLD | SF_DOWN) & (C_POS < (P_IB_LOCKED + HYST)) & (C_POS > (P_FLOOR + FLOOR_UP_OFFSET)) & !P_ERROR & O_BARRIER & O_LATCH & !THRESH_A & !THRESH_B)</td></tr>
<tr><td>AN</td><td>((UP ^ SF_UP) & !(DOWN | FOLD | UNFOLD | SF_DOWN) & (C_POS < (P_IB_LOCKED + HYST)) & (C_POS > (P_FLOOR + FLOOR_UP_OFFSET)) & !P_ERROR & O_BARRIER & O_LATCH & !THRESH_A & !THRESH_B)</td></tr>
<tr><td>AO</td><td>((UP ^ SF_UP) & !(DOWN | FOLD | UNFOLD | SF_DOWN) & (C_POS <= (P_FLOOR + FLOOR_UP_OFFSET)) & (C_POS > (P_FLOOR - HYST)) & O_BARRIER & !THRESH_A & !THRESH_B)</td></tr>
<tr><td>AP</td><td>((UP | DOWN | FOLD | UNFOLD | SF_UP | SF_DOWN) & O_BARRIER & SWITCH_ON)</td></tr>
<tr><td>AQ</td><td>(!(UP | DOWN | FOLD | UNFOLD | SF_UP | SF_DOWN))</td></tr>
<tr><td>AR</td><td>(!(UNFOLD ^ SF_DOWN) | FOLD | UP | DOWN | SF_UP)</td></tr>
<tr><td>AS</td><td>(!(UP ^ SF_UP) | DOWN | FOLD | UNFOLD | SF_DOWN)</td></tr>
<tr><td>AT</td><td>((UP ^ SF_UP) & !(DOWN | FOLD | UNFOLD | SF_DOWN) & (C_POS < (P_IB_LOCKED + HYST)) & (C_POS > P_FLOOR) & !P_ERROR & O_BARRIER & !THRESH_A & !THRESH_B)</td></tr>
</table>

Fig. 3D

| | |
|---|---|
| AU | ((FOLD ^ SF_UP) & !(UNFOLD \| UP \| DOWN \| SF_DOWN) & O_BARRIER) |
| AV | ((FOLD ^ SF_UP) & !(UNFOLD \| UP \| DOWN \| SF_DOWN) & (C_POS > P_S_RELIEF) & (D_UP \| FOLD_IGNORE) & !P_ERROR) |
| AW | ((FOLD ^ SF_UP) & !(UNFOLD \| UP \| DOWN \| SF_DOWN) & (C_POS < (P_S_RELIEF + HYST)) & D_UP) |
| AX | ((FOLD ^ SF_UP) & !(UNFOLD \| UP \| DOWN \| SF_DOWN) & (C_POS < (P_S_RELIEF + HYST)) & (D_UP \| FOLD_IGNORE)) |
| AY | ((FOLD ^ SF_UP) & !(UNFOLD \| UP \| DOWN \| SF_DOWN) & !D_UP & !P_ERROR) |
| AZ | (0) |
| BA | (1) |
| BB | ((FOLD \| UNFOLD \| UP \| DOWN \| SF_UP \| SF_DOWN) & SWITCH_ON) |
| BC | (!(FOLD \| UNFOLD \| UP \| DOWN \| SF_UP \| SF_DOWN)) |
| BD | ((C_POS < P_STOWED) & !P_ERROR) |
| BE | ((C_POS >= (P_STOWED + HYST)) & !P_ERROR) |
| BF | ((SF_DOWN ^ UNFOLD) & !(FOLD \| UP \| DOWN \| SF_UP) & (C_POS > P_STOWED) & !P_ERROR) |
| BG | ((FOLD ^ SF_UP) & !(UNFOLD \| UP \| DOWN \| SF_DOWN) & !P_ERROR) |
| BH | ((C_POS >= (P_FLOOR - HYST)) & !P_ERROR) |
| BI | ((C_POS < (P_FLOOR - HYST - 3)) & !P_ERROR) |
| BJ | ((FOLD ^ SF_UP) & !(UNFOLD \| UP \| DOWN \| SF_DOWN) & !D_UP & !P_ERROR) |
| BK | ((DOWN ^ SF_DOWN) & !(UP \| FOLD \| UNFOLD \| SF_UP) & !THRESH_A & !THRESH_B & (I_BARRIER \| (C_POS < P_IB_LOCKED)) & !P_ERROR & SWITCH_ON) |
| BL | (!(DOWN ^ SF_DOWN) \| UP \| FOLD \| UNFOLD \| SF_UP) |
| BM | ((DOWN ^ SF_DOWN) & !(UP \| FOLD \| UNFOLD \| SF_UP) & !THRESH_A & !THRESH_B & (I_BARRIER \| (C_POS < P_IB_LOCKED)) & !P_ERROR & !BRIDGE) |

Fig. 3E

<table>
<tr><td>BN</td><td>(((DOWN ^ SF_DOWN) & !(FOLD | UNFOLD | UP | SF_UP) & I_BARRIER & !THRESH_A & !THRESH_B & !BRIDGE & (C_POS > (P_IB_LOCKED - HYST)) & !LAST_DIR & !P_ERROR))</td></tr>
<tr><td>EA</td><td>(((UP | DOWN | FOLD | UNFOLD | SF_UP | SF_DOWN) | ((C_POS > P_IB_LOCKED) & !I_BARRIER) | ((C_POS > P_THRESHOLD) & (THRESH_A | THRESH_B)) | (((!O_BARRIER | !O_LATCH) & (C_POS < P_IB_LOCKED))) | (!O_BARRIER & !OB_WARN_FLAG & BRIDGE) | ((!O_BARRIER | !O_LATCH) & (UP | DOWN | FOLD | UNFOLD | SF_UP | SF_DOWN) & (C_POS <= (P_GROUND_BACKUP - MAX_DEPART)) & !DEPART) | (!O_BARRIER & !OB_OCC & (UP | DOWN | FOLD | UNFOLD | SF_UP | SF_DOWN)) | ((!O_BARRIER | !O_LATCH) & (UP | DOWN | FOLD | UNFOLD | SF_UP | SF_DOWN) & (C_POS <= (P_GROUND - THREE_INCHES))) | (!IB_OCC & (UP | DOWN | FOLD | UNFOLD | SF_UP | SF_DOWN) & ((C_POS > P_FLOOR) & (C_POS < P_THRESHOLD)))) & !P_ERROR & SWITCH_ON)</td></tr>
<tr><td>EB</td><td>(!O_BARRIER | !O_LATCH | !IB_OCC)</td></tr>
<tr><td>EC</td><td>(O_BARRIER & O_LATCH & ((C_POS > (P_FLOOR - HYST))) | (C_POS < (P_FLOOR + HYST)))</td></tr>
<tr><td>ED</td><td>(!O_BARRIER | !O_LATCH | THRESH_A | THRESH_B)</td></tr>
<tr><td>EE</td><td>(!O_BARRIER | !O_LATCH | (DOWN & !IB_OCC))</td></tr>
<tr><td>EF</td><td>(THRESH_A | THRESH_B | !I_BARRIER | !O_BARRIER)</td></tr>
<tr><td>EG</td><td>(((C_POS <= (P_GROUND - THREE_INCHES)) & !O_BARRIER) | THRESH_A | THRESH_B | !I_BARRIER)</td></tr>
<tr><td>EH</td><td>(THRESH_A | THRESH_B | !O_BARRIER | !O_LATCH)</td></tr>
</table>

Fig. 3F

<table>
<tr><th></th><th></th></tr>
<tr><td>EI</td><td>(!P_ERROR & (THRESH_A | THRESH_B | ((C_POS > P_IB_LOCKED) & !I_BARRIER) | ((C_POS <= P_IB_LOCKED) & !O_BARRIER) | (!IB_OCC & (DOWN | SF_DOWN) & (C_POS < P_THRESHOLD)) | ((DOWN | SF_DOWN) & !O_BARRIER & !(D_POS >= (C_POS - MAX_DOWN))) | ((C_POS <= (P_GROUND_BACKUP - MAX_DEPART)) & (!O_BARRIER | !O_LATCH)) | (!OB_WARN_FLAG & !O_BARRIER & BRIDGE) | ((C_POS <= (P_GROUND - THREE_INCHES) & (!O_BARRIER | !O_LATCH) & DEPART))))</td></tr>
<tr><td>EJ</td><td>(!THRESH_A & !THRESH_B)</td></tr>
<tr><td>EK</td><td>(((C_POS <= (P_GROUND_BACKUP - MAX_DEPART)) & !O_BARRIER) | THRESH_A | THRESH_B | !I_BARRIER | (!OB_OCC & !O_BARRIER))</td></tr>
<tr><td>EL</td><td>(THRESH_A | THRESH_B | !I_BARRIER | (!(D_POS >= (C_POS - MAX_DOWN)) & !O_BARRIER))</td></tr>
<tr><td>EM</td><td>(THRESH_A | THRESH_B | (!I_BARRIER & (C_POS >= P_IB_LOCKED)))</td></tr>
<tr><td>PA</td><td>(SWITCH_ON)</td></tr>
<tr><td>PB</td><td>(!P_ERROR & (C_POS < P_STOWED))</td></tr>
<tr><td>PC</td><td>(!P_ERROR & (C_POS < (P_FLOOR - HYST) ) & (C_POS >= P_STOWED))</td></tr>
<tr><td>PD</td><td>(!P_ERROR & (C_POS >= (P_FLOOR - HYST)) & (C_POS < (P_FLOOR + HYST)))</td></tr>
<tr><td>PE</td><td>(!P_ERROR & (C_POS >= (P_FLOOR + HYST)))</td></tr>
<tr><td>PF</td><td>(P_ERROR)</td></tr>
<tr><td>PG</td><td>(!P_ERROR)</td></tr>
<tr><td>SA</td><td>(POSITION_SET_PB & SWITCH_ON & !POSITION_SET_DONE)</td></tr>
<tr><td>SB</td><td>(POSITION_SET_PB & !POSITION_SET_DONE & SWITCH_ON)</td></tr>
<tr><td>SC</td><td>(!SWITCH_ON | POSITION_SET_DONE)</td></tr>
<tr><td>VA</td><td>(!SWITCH_ON)</td></tr>
<tr><td>VB</td><td>(SWITCH_ON & !POSITION_SET_PB)</td></tr>
</table>

Fig. 3G

| Variable | Description |
|---|---|
| P_ERROR | Flag to declare that the position is out of a valid range of the RPS |
| FOLD | Operation of the fold pushbutton on the hand pendant |
| UNFOLD | Operation of the unfold pushbutton on the hand pendant |
| UP | Operation of the up pushbutton on the hand pendant |
| DOWN | Operation of the down pushbutton on the hand pendant |
| SF_UP | Operation of the single function pushbutton or remote control that allows up or fold capability |
| SF_DOWN | Operation of the single function pushbutton or remote control that allows down or unfold capability |
| SWITCH_ON | Flag to indicate that the vehicle secure interlock is on, and not just a low battery |
| O_BARRIER | Flag to indicate that the outboard barrier is up |
| O_LATCH | Flag to indicate that the outboard barrier is locked |
| OB_OCC | Flag to indicate the outbound barrier is occupied |
| IB_OCC | Flag to indicate the inboard barrier is occupied |
| BRIDGE | Flag to indicate the bridge microswitch is active |
| I_BARRIER | Flag to indicate that the inboard barrier is up and locked |
| C_POS | Current position of the platform |
| P_STOWED | Stowed position |
| HYST | Hysteresis value from hysteresis filter |
| P_FLOOR | Floor position |
| FLOOR_UP_OFFSET | Offset value to allow the lift to rise to floor level |
| FLOOR_DOWN_OFFSET | Offset value to allow the lift to unfold |
| THRESH_A | Input from a sensor used to indicate that there is an occupant on the platform |
| THRESH_B | Input from a sensor used to indicate that there is an occupant on the platform |
| P_IB_LOCKED | Position reference that requires the inboard barrier to be locked |
| OB_WARN_FLAG | Flag to detect if the outboard barrier is up and locked |
| MAX_DOWN | Allows movement downward a fixed distance after outboard barrier opens |
| MAX_DEPART | Allows movement for a fixed distance while departing to ground level |
| P_S_RELIEF | Position reference that turns the valve to the hydraulic pump on to give full pressure |
| D_POS | Position reference set by the outboard barrier after it is deployed |
| P_GROUND | Ground position |
| P_GROUND_BACKUP | Position reference created when the up pushbutton is pressed |
| THREE_INCHES | Calculated reference three inches from the ground |
| FOLD_IGNORE | Flag used by the controller to ignore motion |
| FOLD_CTR | Counter for determining whether the lift is moving while folding |
| LV_DROP | Flag for detecting voltage dropped below reliable operating voltage |
| DEPART | Flag set when ground detect switch is lost, which defines the ground position |
| GND_REF | Flag set when first leaving ground to record backup ground position |
| POSITION_COUNTS | Array to store positions while averaging |
| NUM_TO_AVG | Number of positions to average to help account for noise |
| P_POS | Previous position |
| D_UP | Flag for current direction down |
| LAST_DIR | Flag for last direction if not moving |
| ONE_SHOT | Compensation for the voltage drop from the first time the motor turns |
| POSITION_SET_PB | Operation of the position set pushbutton |
| POSITION_SET_DONE | Flag to indicate that the position of the floor has been set |

Fig. 4

| State Diagram Number | State Name | Description |
|---|---|---|
| 1 | Lift Stowed | Lift is in the stowed position |
| 2 | Unfold | Lift is unfolding |
| 3 | Paused Unfold | Lift has paused unfolding |
| 4 | Floor Level | Lift is in the floor positon |
| 5 | Start Down | Lfit is starting to move down |
| 6 | Below Threshold | Platform is one inch below floor level |
| 7 | Below IB | Lift is below the point that the inboard barrier is up and locked |
| 8 | Ground Level | Lift is in the ground position |
| 9 | Start Up | Lift is starting to move up |
| 10 | Above IB | Lift is above the point that the inboard barrier is up and locked |
| 11 | Paused Up | Lift has paused going up |
| 12 | Slo-Fold | Limits the pressure on the hydraulic pump |
| 13 | Fold | Lift is folding into the stowed position |
| 14 | Timed Fold | Hydraulic pump is running to pressurize lift in stowed position |
| 15 | Stopped Fold | Lift has stopped folding |
| 16 | Paused Fold | Lift has paused folding |
| 17 | Ground Departure | Ground contact sensor has lost contact |
| 18 | Above 3" | Lift platform is above three inches off of the ground |
| 19 | Rollstop Down | Outboard barrier is down |
| 29 | Fault Interlock | A fault has occurred in the interlock system |
| 30 | Position Error | Lift is in an invalid position |
| 31 | Position Verify | Verify the current position that the lift is in prior to transition |
| 77 | Vehicle Not Secure | A vehicle not secure signal has been detected |
| 90 | Position Set Sub | The mode that allows the floor position to be set |

Fig. 6

WHEELCHAIR LIFT WITH A ROTARY SENSOR USED TO DETERMINE LIFT POSITION

FIELD

Embodiments of the invention relate to safety and control systems for wheelchair lifts and ramps.

BACKGROUND

Safety and control systems for vehicle wheelchair lifts are known, and have been employed to ensure the well-being of wheelchair lift users. Safety systems for wheelchair lifts have been proposed that include numerous mechanical, electrical, or electromechanical sensing systems. However, existing sensing systems can be costly and/or difficult to implement. Moreover, current mechanical systems can be hard to adjust and can be time consuming to manufacture.

SUMMARY

The inventors have learned that it is advantageous to provide a system for sensing the position of a vehicle wheelchair lift platform that has fewer sensors, that is less dependent on mechanical features, and more reliable. The following summary describes certain features of the embodiments described in greater detail below. The summary is not limiting of embodiments of the invention.

In one embodiment, a method of controlling an operation of a wheelchair lift is disclosed. The method may include generating a signal indicative of a position of a platform of the wheelchair lift (a "position signal") using a sensor such as a rotary position sensor; storing a set of conditions in a controller, where the conditions are related to the position of the platform of the lift; and comparing the position signal to the conditions stored in the controller. The method may also include generating an output signal based on the comparison of the position signal and the conditions stored in the controller; and controlling an operation of the lift based on the output signal.

In some embodiments, a sensor that is capable of generating a signal indicative of the position of a platform through a range of motion is used.

In another embodiment, a wheelchair lift is disclosed. The wheelchair lift may include a lift having a pivot and a platform as well as a sensor (such as a rotary position sensor) mounted at the pivot. The sensor is configured to generate an output signal; and a controller is configured to receive the output signal of the sensor and determine the position of the platform based on the output of the sensor.

In yet another embodiment, a vehicle having a wheelchair lift is disclosed. The wheelchair lift may include a lift having a pivot and a platform. A sensor is mounted at the pivot and configured to generate an output signal. A ground contact sensor is configured to generate a signal indicative of whether the platform is in contact with a ground surface. The lift may also include an interlock system configured to generate a signal indicative of a condition of the vehicle; and a controller configured to receive the output signal of the rotary position sensor, the signal indicative of whether the platform is in contact with a ground surface, and the signal indicative of a condition of the vehicle. The controller may be configured to determine the position of the platform based on the output of the rotary position sensor and to control motion of the platform.

In some embodiments, a contact sensor is unnecessary. Information from multiple other sensors may be combined or otherwise processed to determine when the platform is in contact with a ground surface.

These and other features and embodiments will become apparent after reviewing the descriptions herein and the drawings described in the succeeding section.

BRIEF DESCRIPTION OF THE DRAWINGS

FIG. 3A. is an exemplary table of Boolean expressions associated with the operation of a wheelchair lift.

FIG. 3B. is an exemplary table of Boolean expressions associated with the operation of a wheelchair lift.

FIG. 3C. is an exemplary table of Boolean expressions associated with the operation of a wheelchair lift.

FIG. 3D. is an exemplary table of Boolean expressions associated with the operation of a wheelchair lift.

FIG. 3E. is an exemplary table of Boolean expressions associated with the operation of a wheelchair lift.

FIG. 3F. is an exemplary table of Boolean expressions associated with the operation of a wheelchair lift.

FIG. 3G. is an exemplary table of Boolean expressions associated with the operation of a wheelchair lift.

FIG. 4 is an exemplary table of variables associated with the operation of a wheelchair lift.

FIG. 6 is an exemplary table of state descriptions associated with a wheelchair lift.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "processor" may include or refer to both hardware and/or software. Thus, the claims should not be limited to the specific examples or terminology or to any specific hardware or software implementation or combination of software or hardware.

Figure 1A:
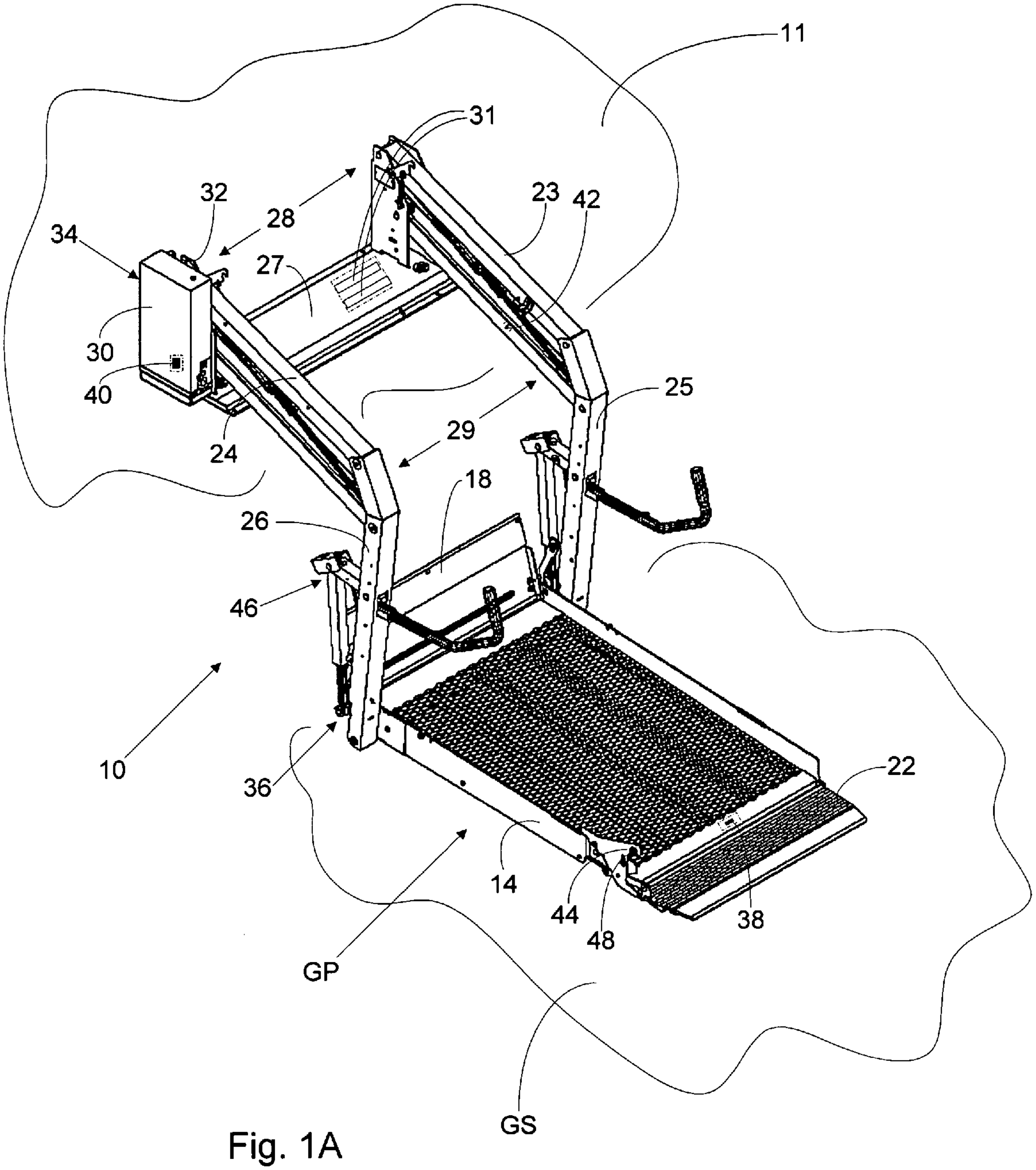
FIG. 1A is an exemplary embodiment of a vehicle wheelchair lift mounted to a floor of a vehicle and located in a ground position.

FIG. 1A is an exemplary embodiment of a wheelchair lift 10. In the embodiment shown, the wheelchair lift 10 is configured to be coupled to a floor 11 at the back of a vehicle (not shown), although other configurations are possible. The mechanical components of the exemplary lift 10 include a platform 14, an inboard gate 18, an outboard gate 22, upper lifting arms 23, 24, lower lifting arms 25, 26, a base plate 27, an upper pivot 28, a lower pivot 29 and a control box 30. Electrical components of the wheelchair lift 10 may include threshold sensors 31 (located under the top plate of the base plate 27), a rotary position sensor ("RPS") 32, a position set switch 34 (located on the back of the control box 30), a bridge switch 36, a ground detect or contact switch 38 (located under the front edge of the platform 14), an outboard barrier occupied sensor 40 (located inside the upper lifting arm 23), an inboard barrier occupied sensor 42, an outboard barrier up sensor 44, an inboard barrier up sensor 46, and an outboard barrier latched sensor 48. The lift 10, however, can be configured differently and is not limited to the arrangement described.

Figure 1B:
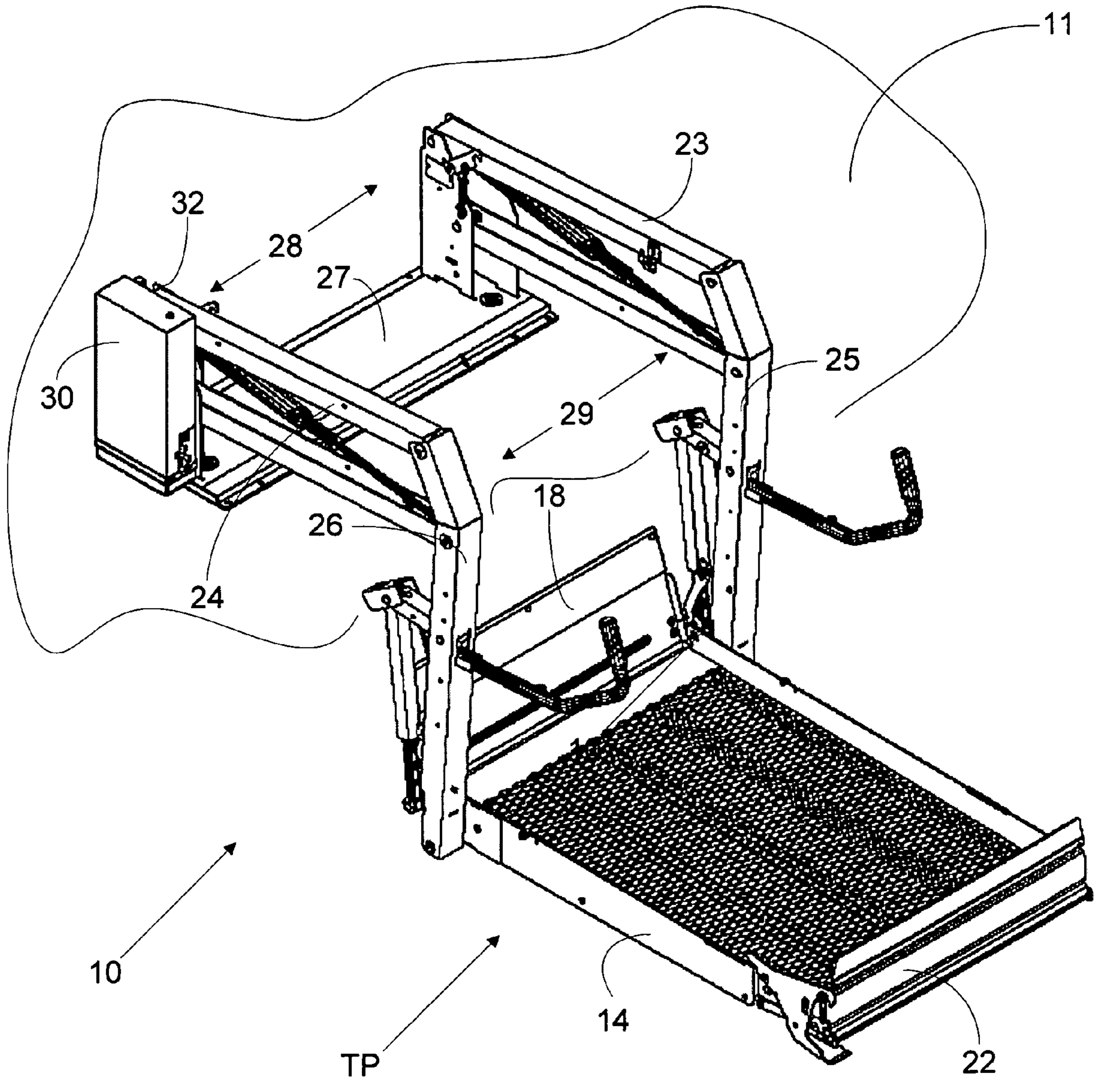
FIG. 1B is an exemplary embodiment of a vehicle wheelchair lift in a transition position.
Figure 1C:
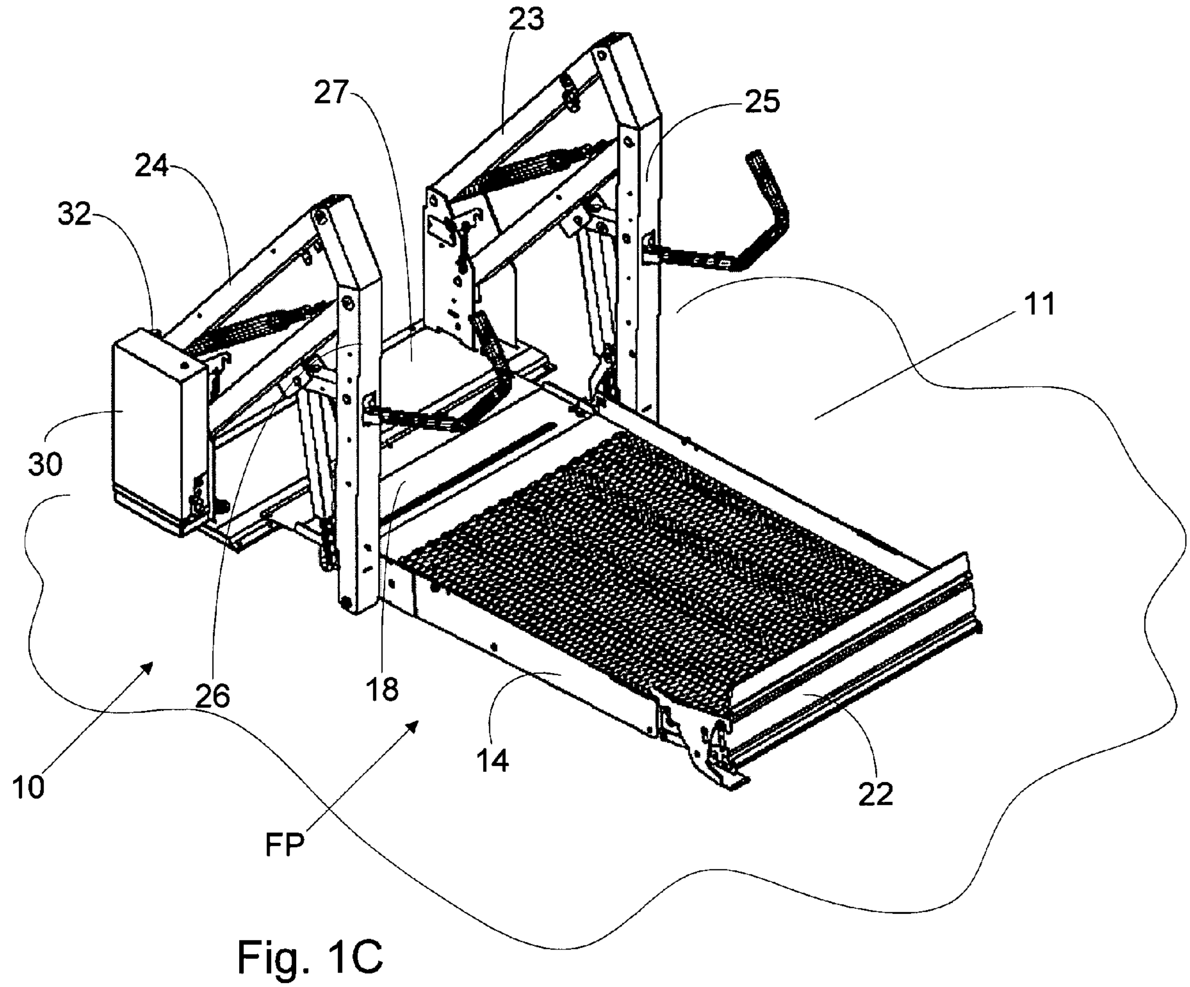
FIG. 1C is an exemplary embodiment of a vehicle wheelchair lift in a floor position.
Figure 1D:
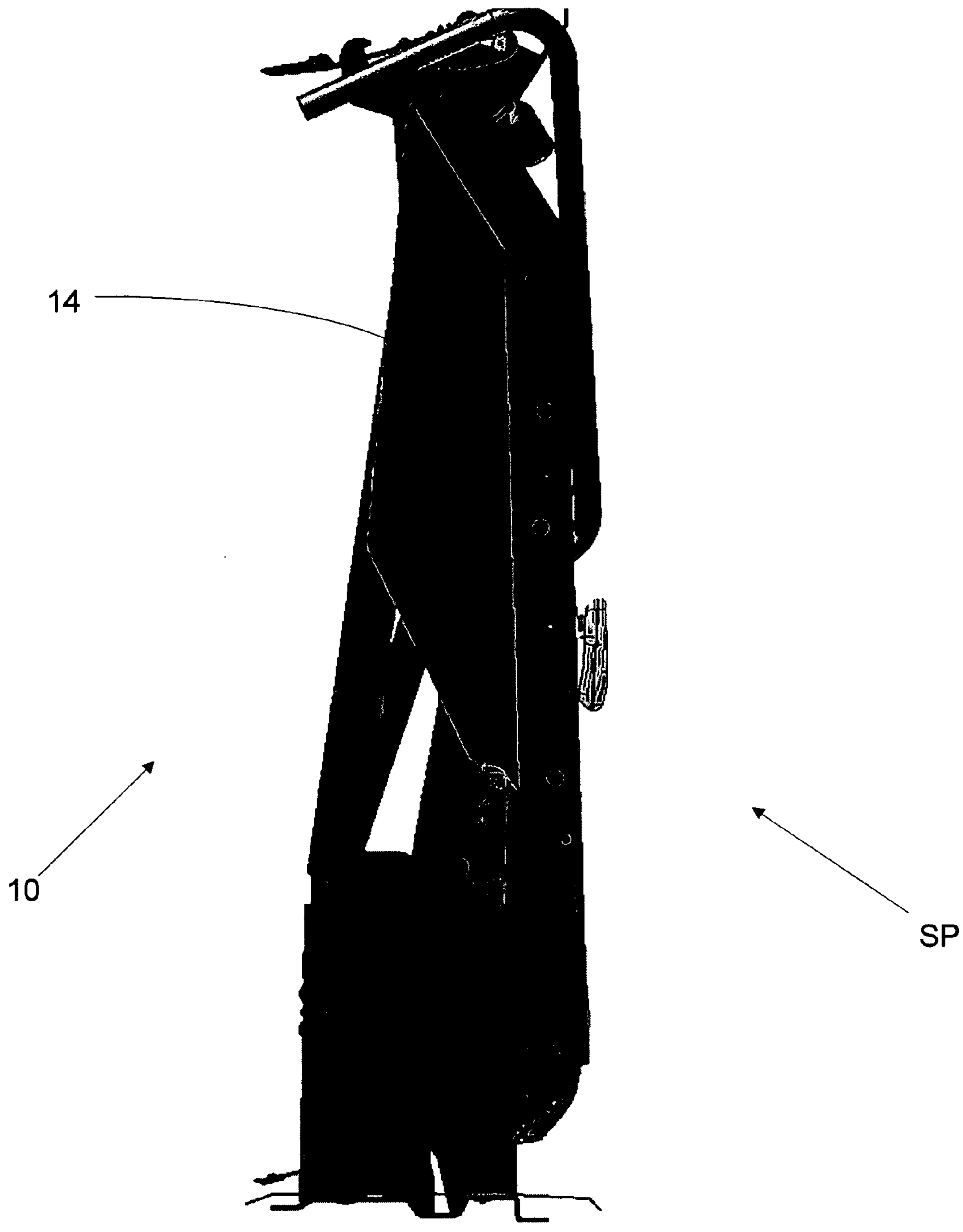
FIG. 1D is an exemplary embodiment of a vehicle wheelchair lift in a stowed position.

The exemplary lift 10 can be moved to or placed in a plurality of operating positions, including a "ground position" ("GP") (FIG. 1A), a "transfer position" ("TP") (FIG. 1B), a "floor position" ("FP") (FIG. 1C), and a "stowed position" ("SP") (FIG. 1D). These positions are provided as examples, and the wheelchair lift 10 may be moved to other positions. These positions are described in greater detail below.

Referring back to FIG. 1A, the motion of the platform 14 is controlled by the upper lifting arms 23, 24, and the lower lifting arms 25, 26. The upper arms 23, 24 rotate using the upper pivot 28, and are coupled to the base plate 27, which is secured to the vehicle. The upper arms 23, 24 are connected to the lower arms 25, 26 at the lower pivot 29. The upper pivot 28 and the lower pivot 29 allow the platform to move from the ground position GP to the floor position FP and the stowed position SP.

When the wheelchair lift 10 is in the ground position GP the platform 14 is fully lowered on a ground surface ("GS"). An occupant (not shown) may move onto the platform 14 when it is fully lowered on to a ground surface GS. For example, an occupant in a wheelchair may wheel him or herself on to the platform 14. The ground surface GS could include any loading area surface (e.g., parking lot, sidewalk, driveway, and the like) that the vehicle may be located on. In the exemplary embodiment shown, there are various functions associated with the ground position. When the lift platform 14 makes contact with the ground surface GS, a reference signal indicative of the location of the lift 10 in the ground position GP is created. After the lift platform 14 contacts the ground surface GS, the inboard gate 22 is lowered so that the occupant can make the transition onto the lift 10. After the occupant is on the lift 10, controls can be utilized to begin accent to the floor position FP.

Once the occupant is on the lift platform 14, the wheelchair lift 10 moves to the transfer position TP (FIG. 1B). The outboard gate 22 is raised and locked after the lift platform 14 is raised more than 3 inches from the ground surface GS. The RPS 32 transmits a position signal that is used to calculate a position at which the platform 14 is three inches above the ground surface GS. Measurements begin once the ground contact sensor 38 looses contact with the ground, or after a plurality of other sensors included on the lift 10 meet a certain conditional set of requirements stored in a controller. A sensor suitable for use as the RPS 32 is an RS-60 non-contact rotary position sensor manufactured by Power Components Midwest. However, other commercially available sensors capable of tracking range of motion or rotational motion could be used.

The wheelchair lift 10 can transition from the ground position GP to the floor position FP. When the platform 14 reaches the floor position FP, the inboard gate 18 is lowered to allow the occupant to enter the vehicle. The floor position FP is initially set by the user with a floor position set switch 34. The task of setting up the floor position FP can be accomplished by positioning the platform 14 to the desired floor position FP (which may vary depending on the make and model of the vehicle). In one embodiment, once the platform 14 is at a desired position, power to the lift 10 is turned off and a position set switch 34 is actuated. After the position set switch 34 is actuated (e.g., pressed), the position of the platform 14 in the floor position FP is marked by the RPS 32 and stored in a controller. The platform 14 is moved to this position every time the occupant or user chooses to raise the platform 14 to the floor position FP. When the platform 14 is located at the floor position FP, the occupant can move from the platform 14 into the vehicle, or vice versa. In the embodiment shown, the threshold sensors 31, which are included under the base plate 27, are used to detect the presence of an occupant in the threshold area (i.e., on the base plate 27). If signals from the threshold sensors are received by a controller (which is described below in connection with FIG. 2), and the platform 14 is detected to be at least one inch below the floor position FP indicating danger to the occupant.

When the wheelchair lift 10 is not in use, it can be collapsed and stored in the stowed position SP (FIG. 1D). In the stowed position SP, the platform 14 is arranged vertically and perpendicular with the ground. The inboard gate 18 and outboard gate 22 are also in their raised positions, which arranges them perpendicular to the platform 14. When in the stowed position the area, or footprint, occupied by the lift 10 within the vehicle is reduced.

Figure 2:
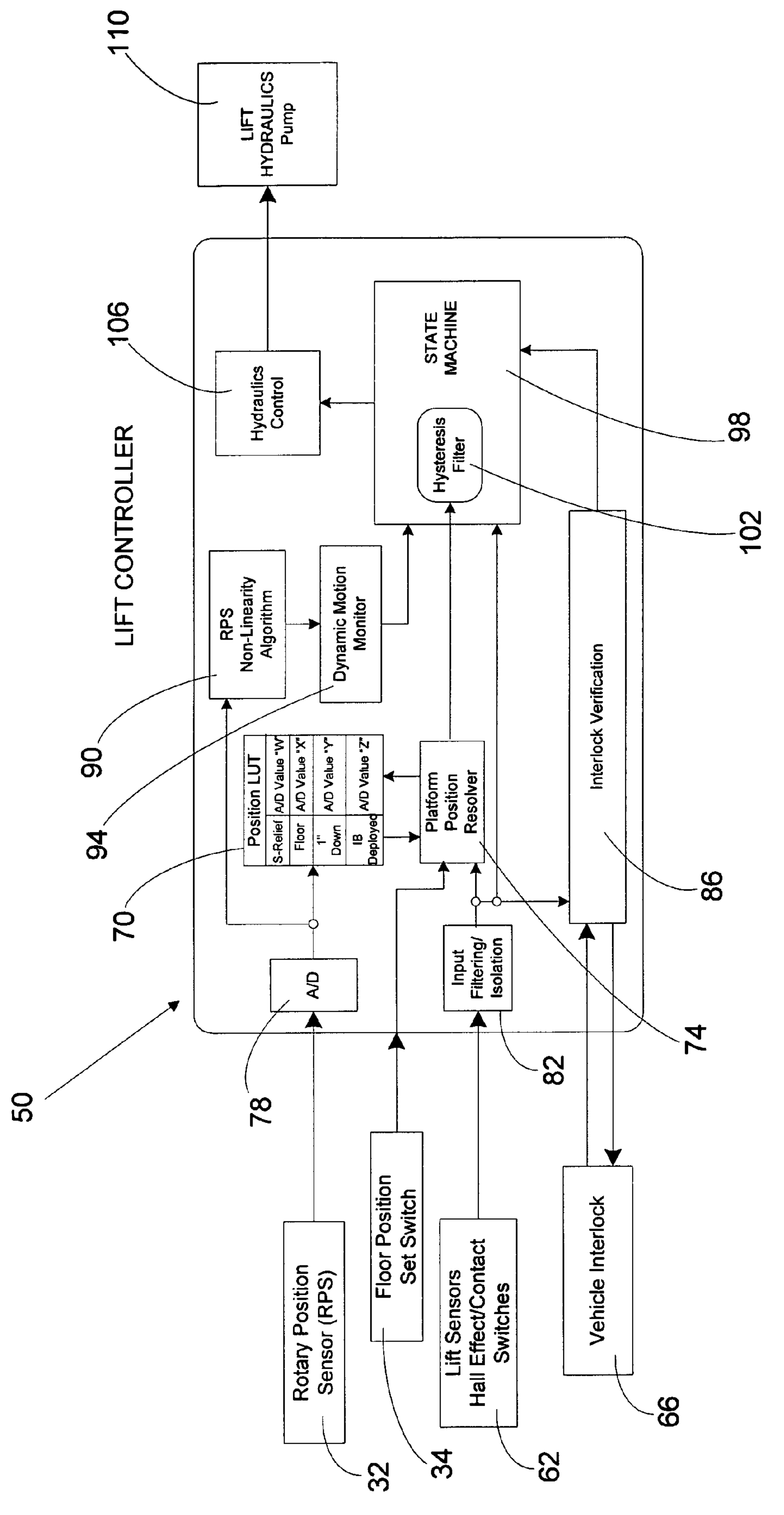
FIG. 2 is an exemplary embodiment of a controller used in a wheelchair lift.

FIG. 2 illustrates an exemplary controller 50. The controller 50 is configured to communicate with a plurality of input and output devices, including both analog and digital components of the wheelchair lift 10. FIG. 2 also illustrates a plurality of modules of the controller 50, and helps illustrate how certain operations are performed by the controller 50. The controller 50, however, is capable of accepting other inputs and controlling other output devices different than those shown, and is not limited to the internal operations and modules depicted.

In the embodiment shown, the controller 50 receives input signals from the RPS 32, the floor position set switch 34, a plurality of lift sensors and contact switches 62 (which may include the previously described sensors 36-48), and a vehicle interlock system 66. The RPS 32 can be configured to track the position of the platform 14 throughout its entire range of motion. In the exemplary embodiment shown, the RPS 32 is an analog encoder that is coupled to one of the pivot points 28 of the lift 10, and provides a voltage signal indicative of the platform 14 position. For instance, the stowed position SP may have an output voltage reference signal of 0.488 volts at 90 degrees, while the floor position FP may have an output voltage reference signal of 1.71 volts at 50 degrees. The voltage reference signals and corresponding angles, however, may vary depending on the application and the RPS 32 used. The floor position set switch 34 is used to set the floor position FP the first time that the wheelchair lift 10 is used, as previously described. The ground contact switch 38 is configured to contact the ground surface GS when the wheelchair lift 10 is in the ground position GP, and provide a signal to the controller 50 indicative of the ground position GP, as previously described. The other contact switches 62 can be used to sense the positions of the inboard barrier 18 and the outboard barrier 22 as previously described. In other embodiments the RPS 32 can be a variety of devices that track position (e.g., proximity sensors) and could be mounted in any suitable location conducive to tracking the movement of the platform 14.

The controller 50 includes a look-up table ("LUT") 70, a platform position resolver 74, an analog-to-digital ("A/D") converter 78, an input filtering/isolation module 82, an interlock verification module 86, an RPS non-linearity algorithm module 90, a dynamic motion monitor module 94, a state machine module 98 (which includes a hysteresis filter 102), and a hydraulics control module 106.

In the embodiment shown, the floor position FP can be stored in the LUT 70 for use in subsequent lift operations after the position set switch 34 is pressed during the previously described floor position FP setup. The platform position resolver 74 is used to convert the floor position set switch signal into a storable position signal prior to the position being stored in the LUT 70. The signal from the analog rotary encoder 58 is also converted to a storable digital signal using the A/D converting module 78. The signals from the plurality of lift sensors and contact switches 62 are received by the controller 50 using the input filtering/isolation module 82, which separates (or isolates) each sensor signal. The signals are isolated so that each signal can be used separately by the controller 50. The vehicle interlock system 66 also communicates with the controller 50 via the interlock verification module 86. In other embodiments, modules can be configured differently to accept signals other than those shown. Furthermore, different components and modules may be utilized internally within or externally of the controller to manipulate the input signals (e.g., external A/D converter, different signal isolation mechanisms, and different information storing mechanisms or types of memory) to achieve a similar result.

Signals from the input devices can be manipulated by additional operations performed by modules internal to the controller 50, as shown in the exemplary FIG. 2. In the exemplary embodiment shown, the RPS non-linearity algorithm module 90 is configured to receive a signal from the A/D converter 78, and compute the current position of the platform 14. The RPS non-linearity algorithm module 90 is used in the embodiment shown to detect the vertical distance that the platform 14 travels. The controller 50 uses the RPS non-linearity algorithm module 90 because the distance is not linear with respect to the rotational motion of the lift arm. The RPS non-linearity algorithm module 90 converts the rotational motion of the RPS 32 to a vertical distance. The dynamic motion monitor module 94 receives the conditioned signal from the RPS non-linearity algorithm module 90, and transmits a signal to the state machine module 98 indicative of motion of the lift 10. If the state machine module 102 receives a signal indicative of lift motion, and the signal received by the dynamic motion monitor module 94 from the A/D converting module 78 does not indicate that the lift 10 is in motion, the controller 50 triggers a fault condition and resets the controls. The state machine module 98 also receives signals from the platform position resolver 74, the input filtering/isolation module 82, and the interlock verification module 86. The signal from the platform position resolver 74 is sent to a hysteresis filter 102 that is included in the state machine module 98. The hysteresis filter 102 provides a tolerance "window" for the signal received from the platform position resolver 74. The tolerance window is used to reduce irregularities in the signal (such as noise) that may otherwise compromise the ability of the controller 50 to stop the movement of the lift 10 at any particular position.

The exemplary controller shown in FIG. 2 transmits the signal from the state machine module 98, and hysteresis filter 102, to the hydraulics control module 106, which utilizes the signal to operate an external lift hydraulic pump 110. The hydraulics control module 106, in the embodiment shown, is configured to transmit a signal to the lift hydraulic pump 110. The signal can be used to turn the hydraulic pump on and off. The hydraulic pump 110 provides the fluid required by hydraulic components of the lift 10. In other embodiments, the controller 50 can be configured to operate the lift hydraulics pump 110 differently (e.g., a direct connection from the lift hydraulic pump 110 to the state machine module 98).

A plurality of operations of the lift 10 can be described by an exemplary set of Boolean expressions shown in FIG. 3. The exemplary Boolean expressions combine variables that are related to specific components, operations, and positions of the lift 10 with a variety of Boolean operators. The expressions are stored in the controller 50. The Boolean operators in the exemplary expression table of FIG. 3 include a logical "AND" operation ("&"), a logical "OR" operation ("|"), a logical "XOR (exclusive OR)" operation ("^"), and a logical "NOT" operation ("!"). An exemplary list of variables used in the expressions is shown in the table in FIG. 4. Using the exemplary variable table in FIG. 4, and the operators described above, each of the exemplary expressions included in FIG. 3 can be logically described. For instance, an exemplary expression for a transition path "D" from FIG. 3 is shown below:

((*C*_POS>(*P*_FLOOR+HYST))& !*P*_ERROR)

where C_POS represents the current position of the lift platform 14, P_FLOOR represents the previously described floor position FP, HYST represents the previously defined hysteresis, and P_ERROR represents an error that indicates the position of the platform 14 is out of a valid range of the RPS 32. The expression for the transition path D can be logically described as follows: 'The current position of the platform 14 is greater than the combined floor position FP and hysteresis, and there is no error signal present.' If each of the conditions set forth in the exemplary expression are met, the lift will perform the corresponding transition.

Figure 5:
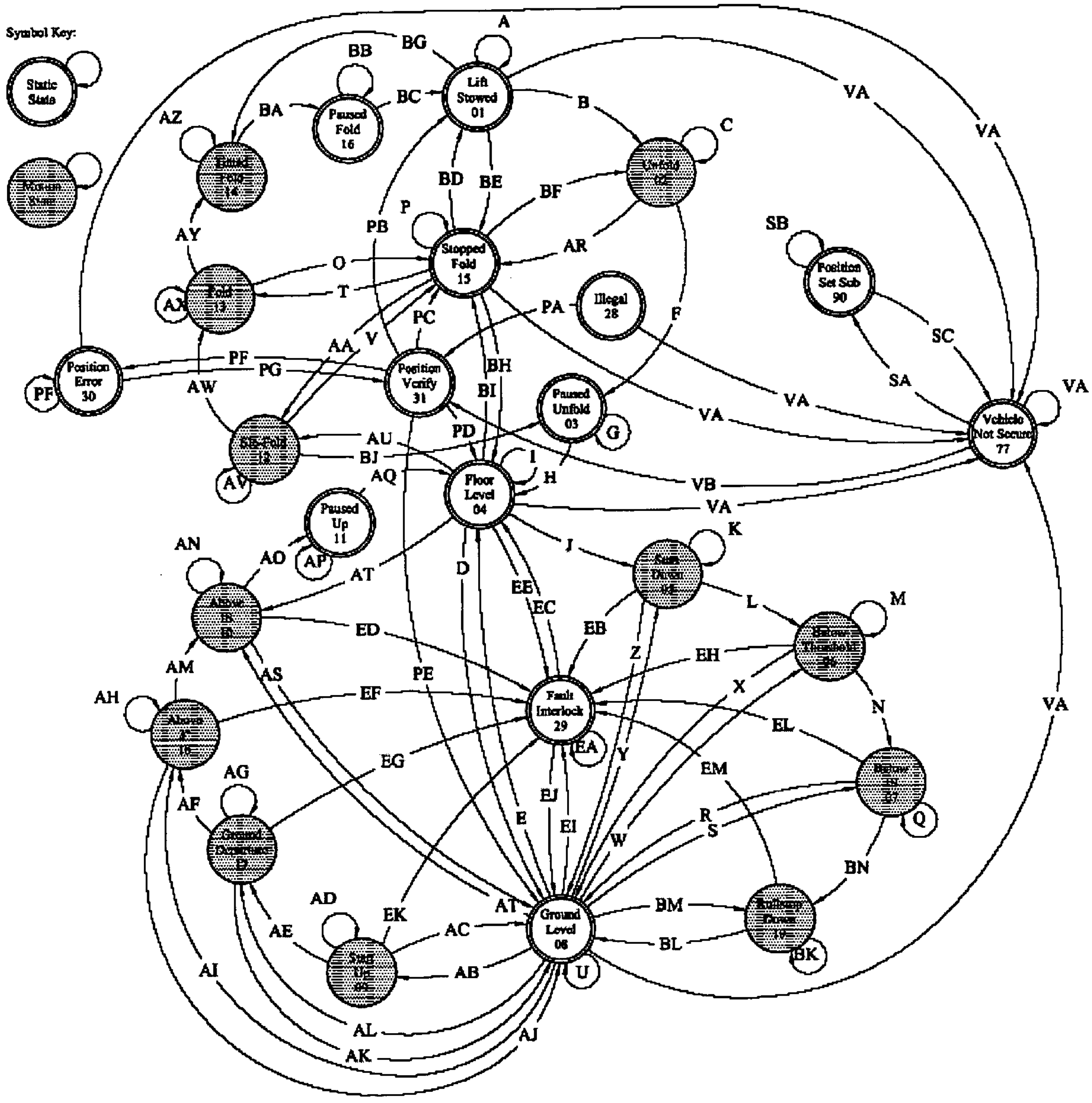
FIG. 5 is an exemplary state diagram associated with the operation of a wheelchair lift.

Transitions cause the state machine module 98 to change states, which cause the lift to operate accordingly. An exemplary state diagram is shown in FIG. 5. The state diagram includes a plurality of static states (no motion) and a plurality of motion states, which are depicted using un-shaded and shaded circles, respectively. As previously described, the transition to different states occurs when the conditions of the previously described Boolean expressions are satisfied. Some of the Boolean expressions can be satisfied with an operator input (e.g., pressing the position set push button), while others require a programmed controller condition to be met (e.g., the outboard gate must be up and locked when the lift 10 is in motion more than three inches above the ground).

The plurality of states shown in the exemplary FIG. 5 can be logically described. In FIG. 5, a "lift stowed" (01) static state is the state that the lift 10 is in when it is in the stowed position SP (FIG. 1D). Path A of the lift stowed (01) static state represents the lift 10 waiting to transition to another state, but remaining in the stowed position SP. Path B of the lift stowed (01) static state represents the transition to an "unfold" (02) motion state. The state transition to the unfold (02) motion state occurs after the controller receives a signal from the operator to unfold, which satisfies the conditions set forth in the Boolean expression stored in the controller 50. The state machine module 98 receives the condition satisfying signals, and transmits a signal to the hydraulics control module 106 to operate to the hydraulics pump 110. The hydraulics pump 110 provides the fluid necessary to put the lift 10 in motion, as previously described. Path C of the unfold (02) motion state represents the lift 10 during the unfolding process, when the lift 10 is in motion. Path F of the unfold (02) motion state represents the transition to a "paused unfold" (03) static state. The paused unfold (03) static state is the state that the lift 10 is in when the state machine module 98 has received a particular signal from the RPS 32 to pause movement. The RPS 32 can detect motion of the lift, and how quickly the motion is occurring. If the hydraulic pump 110 is running during the slo-fold (12) motion state and the RPS 32 detects that there is no motion, the hydraulic pump 110 shuts off, and transition to the paused unfold (03) static state is made. Path H of the paused unfold (03) static state represents a transition to a "floor level" (04) static state. The floor level (04) static state represents the state that the lift 10 is in when the platform 14 is in the previously described floor position FP. Path I of the floor level (04) static state is used to represent the lift in the floor position FP, waiting to transition to another state. Path J is used to represent a transition to a "start down" (05) motion state. The start down (05) motion state is the state that the lift 10 is in after receiving a signal from the operator to transfer from the previously described floor position FP to the previously described ground position GP.

In the interest of brevity, the remainder of the states will not be described in detail. However, the types of activities and motions associated with each state should be apparent to someone of ordinary skill in the art by examining the state diagram table (FIG. 6). The state diagram table shows each state number, the corresponding state name, and a description of the state. It should be understood that the state diagram in FIG. 5 and the corresponding state diagram table in FIG. 6 are shown as examples only, and do not limit the functionality of the lift 10.

To reduce hazards, the exemplary wheelchair lift 10 can be equipped with an interlock system. In the embodiment shown, the previously described threshold sensors 31 are used in the interlock system. The bridge switch 36, near the inboard gate end of the platform 14, opens and stops movement of the lift 10 if the platform 14 is tilted. Tilting may otherwise occur if the outboard gate end of the platform 14 is resting on an obstacle, like a curb, while the inboard end of the platform 14, with the pivot, is lowered all the way to the ground surface GS. The bridge switch 36 at the inboard gate end of the platform 14 limits movement further than the outboard portion of the platform, reducing the hazard to the occupant. The exemplary inboard barrier 18 and outboard barrier 22 also include sensors that are incorporated in the interlock system. The outboard barrier occupied sensor 40 and inboard barrier occupied sensor 42 detect occupants located on the respective barriers, while the outboard barrier up sensor 44 and inboard barrier up sensor 46 verify that each barrier is in the up position. The outboard barrier 22 also includes the outboard barrier locked sensor 48 to verify that the outboard barrier 22 has locked after it has been raised. Operations of the lift 10 can be limited if one or more of the interlock systems are triggered. For example, the platform 14 will not move if the outboard barrier occupied sensor 40 or inboard barrier occupied sensor 42 are generating signals indicative of the presence of an occupant on the barriers.

Other operations of the lift 10 and the inboard and outboard barriers 18, 22 can also be controlled by the interlock system. When the RPS 32 transmits a signal indicating that the platform 14 is one inch below the floor position FP, the outboard barrier 22 must be in the up and locked position for motion to continue. Likewise, if the RPS 32 transmits a signal indicating that the platform 14 is more than three inches above ground position, the outboard barrier 22 must be in the up and locked position. The vehicle interlock system 66 can also be linked directly to other vehicle systems (e.g., a transmission) to verify that the vehicle is stationary and ready to be loaded. In other embodiments, interlock systems can be configured with different sensors (i.e., other mechanical and electrical sensors) to achieve a similar result. Interlock systems can also be configured to operate other wheelchair lift 10 components.

The use of examples, or exemplary language (e.g., "such as") provided herein, is intended merely to better illuminate the invention and does not pose a limitation on the scope of the invention unless otherwise claimed. Various embodiments of this invention are described herein. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wheelchair lift comprising:

a lift having first and second upper lifting arms positioned substantially parallel to one another, each upper lifting arm having a first end and a second end, the lift also having first and second lower lifting arms, the first lower lifting arm connected to the second end of the first upper lifting arm and the second lower lifting arm connected to the second end of the second upper lifting arm, a pivot located between the first ends of the first and second upper lifting arms, and a platform connected to the first and second lower lifting arms and movable between a first lower height and a second higher height;

a rotary position sensor mounted at the pivot and configured to generate an analog output signal that varies with the position of the platform and includes information related to a lift motion and how quickly the lift motion occurs;

a ground detect sensor configured to sense contact of the platform with a solid surface and to output a signal indicative of the same;

a controller configured to receive the output signal of the rotary position sensor, to determine the position of the platform based on the output of the rotary position sensor by converting the information from the rotary position sensor into a vertical distance, to change a logical state of the platform from a motion state to a paused state depending on the information from the rotary position sensor related to the lift motion and how quickly the lift motion occurs, and to receive the signal indicative of contact of the platform with a solid surface.

2. A wheelchair lift as claimed in claim 1, wherein the controller includes a look up table and is configured to use the look up table when determining the position of the platform.

3. A wheelchair lift as claimed in claim 1, further comprising a position set switch configured to output a signal indicative of a certain position and wherein the controller is configured to receive the signal indicative of the certain position.

4. A wheelchair lift as claimed in claim 1, further comprising a plurality of sensors, the plurality of sensors configured to output a plurality of signals indicative of the position or operation of a plurality of wheelchair lift components.

5. A wheelchair lift as claimed in claim 4, wherein the plurality of sensors are used to detect a solid surface and output a signal indicative of the same and wherein the controller is configured to receive the signal indicative of contact of the platform with a solid surface.

6. The wheelchair lift of claim 1, wherein the controller includes an input isolation mechanism, the mechanism configured to receive a plurality of output signals indicative of the position or operation of a plurality of wheelchair lift components and transmit each of the plurality of output signals as a separate entity.

7. A wheelchair lift as claimed in claim 1, wherein the controller includes a resolver, the resolver configured to receive a plurality of signals indicative of wheelchair lift functions, and condition the plurality of signals into digital values to be stored in the controller.

8. A wheelchair lift as claimed in claim 1, wherein the controller includes an interlock verification system, the verification system configured to receive a plurality of signals indicative of the operation of a plurality of wheelchair lift components.

9. A wheelchair lift as claimed in claim 1, further comprising a set of conditions stored in the controller, the set of conditions indicative of a plurality of functions of the wheelchair lift.

10. A wheelchair lift as claimed in claim 1, further compromising a filter configured to remove noise from the output signal of the rotary position sensor before the controller determines the position of the platform.

11. A wheelchair lift as claimed in claim 1, where in the controller is configured to calculate a position at which the platform is approximately three inches above a ground surface based on information from the rotary sensor and the ground detect sensor.

12. A wheelchair lift comprising:

a lift having a pivot and a platform, the platform having an inboard end with an inboard gate and an outboard end having an outboard gate and movable through a range of motion from a ground position to a floor position and to a stowed position;

at least one position sensor mounted at the pivot and configured to generate an output signal indicative of the position of the platform through the range of motion, the output signal including information related to a lift motion and how quickly the lift motion occurs;

a bridge sensor positioned between the inboard end of the platform and the inboard gate and configured to generate a bridge sensor signal;

an inboard barrier occupied sensor configured to generate an inboard barrier signal;

an outboard barrier occupied sensor configured to generate an outboard barrier signal;

a controller configured to receive the output signal of the position sensor and determine the position of the platform based on the output of the position sensor by converting information from the position sensor into a vertical distance, to change a logical state of the platform from a motion state to a paused state depending on the information from the position sensor related to the lift motion and how quickly the lift motion occurs, to receive signals from a vehicle interlock system, and to receive the signals from the bridge sensor, the inboard barrier occupied signal, and the outboard barrier signal, and to generate a control signal for a pump to prevent movement of the lift if signals from the inboard barrier occupied sensor or outboard barrier occupied sensor indicate the presence of an occupant on one of the inboard gate or the outboard gate or a signal from the bridge sensor indicates that the platform is not level.

13. A wheelchair lift as claimed in claim 12, wherein the controller includes a look up table and is configured to use the look up table when determining the position of the platform.

14. A wheelchair lift as claimed in claim 12, wherein the controller includes an input isolation mechanism, the mechanism configured to receive a plurality of output signals indicative of the position or operation of a plurality of wheelchair lift components and transmit each of the plurality of output signals.

15. A wheelchair lift as claimed in claim 12, wherein the controller includes a resolver, the resolver configured to receive a plurality of signals indicative of wheelchair lift functions, and condition the plurality of signals into digital values to be stored in the controller.

16. A wheelchair lift as claimed in claim 12, further compromising a filter configured to remove noise from the output signal of the position sensor before the controller determines the position of the platform.

17. A wheelchair lift as claimed in claim 12, further compromising a ground detect sensor configured to sense contact of the platform with a solid surface and output a signal indicative of the same and wherein the controller is configured to receive the signal indicative of contact of the platform with a solid surface.

18. A wheelchair lift as claimed in claim 12, further compromising a position set switch configured to output a signal indicative of a certain position and wherein the controller is configured to receive the signal indicative of the certain position.

19. A wheelchair lift as claimed in claim 12, wherein the plurality of component sensors are used to detect a solid surface and output a signal indicative of the same and wherein the controller is configured to receive the signal indicative of contact of the platform with a solid surface.

20. A wheelchair lift as claimed in claim 12, wherein the controller includes an interlock verification system, the verification system configured to receive a plurality of signals indicative of the operation of a plurality of wheelchair lift components.

* * * * *